(12) United States Patent
Tanahashi et al.

(10) Patent No.: US 7,377,963 B2
(45) Date of Patent: May 27, 2008

(54) ADSORPTION FILTER AND MANUFACTURING METHOD THEREOF

(75) Inventors: Takashi Tanahashi, Kanagawa (JP); Akihiro Imai, Kanagawa (JP); Toshiro Nakano, Kanagawa (JP); Takashi Taniguchi, Shizuoka (JP)

(73) Assignee: Nichias Corporation, Tokyo (JP)

( * ) Notice: Subject to any disclaimer, the term of this patent is extended or adjusted under 35 U.S.C. 154(b) by 449 days.

(21) Appl. No.: 11/044,737

(22) Filed: Jan. 28, 2005

(65) Prior Publication Data

US 2005/0217488 A1  Oct. 6, 2005

(30) Foreign Application Priority Data

Mar. 30, 2004 (JP) ............ P. 2004-097824
Sep. 30, 2004 (JP) ............ P. 2004-287856

(51) Int. Cl.
   *B01D 53/02* (2006.01)
(52) U.S. Cl. ............... 96/135; 96/153; 96/154; 55/497; 55/521
(58) Field of Classification Search ........... 55/497, 55/511, 521; 96/108, 153, 154, 135
   See application file for complete search history.

(56) References Cited

U.S. PATENT DOCUMENTS

| | | | |
|---|---|---|---|
| 2,130,107 A | * | 9/1938 | Somers .......... 55/517 |
| 3,909,224 A | | 9/1975 | Spencer et al. |
| 5,098,767 A | * | 3/1992 | Linnersten ............ 95/273 |
| 5,252,111 A | | 10/1993 | Spencer et al. |
| 5,348,922 A | | 9/1994 | Kuma et al. |
| 6,485,538 B1 | * | 11/2002 | Toyoshima ............ 55/490 |
| 2001/0029843 A1 | | 10/2001 | Minoru et al. |

FOREIGN PATENT DOCUMENTS

| | | |
|---|---|---|
| EP | 1 101 909 A | 5/2001 |
| EP | 1 121 968 A | 8/2001 |
| JP | 7-289828 | 11/1995 |
| JP | 9-220426 | 8/1997 |
| JP | 9-239223 | 9/1997 |

* cited by examiner

Primary Examiner—Robert A Hopkins
(74) Attorney, Agent, or Firm—Nixon & Vanderhye P.C.

(57) ABSTRACT

An adsorption filter includes at least one thin plate honeycomb filtering medium carrying a gas-adsorbing medium thereon and a filter case housing the honeycomb filtering medium therein. The thin plate honeycomb filtering medium is disposed in the filter case in such a manner as to make a series of V configurations with respect to a ventilation direction.

14 Claims, 8 Drawing Sheets

ADSORPTION FILTER AND MANUFACTURING METHOD THEREOF

FIELD OF THE INVENTION

The present invention relates to a adsorption filter for removing gaseous contaminants such as very low concentration acidic gaseous contaminants, basic gaseous contaminants, and TOC (Total Organic Compound), generated from the human body or generated during a manufacturing process in a clean room of, for example, a semiconductor-manufacturing plant or a precision electronic devices-manufacturing plant, and a manufacturing method thereof.

BACKGROUND OF THE INVENTION

In the leading-edge industries of semiconductor manufacturing/liquid crystal manufacturing, and the like, it is important to control the contamination of the air or the product surface in a clean room in order to ensure the yield, quality, and reliability of a product. In particular, in the semiconductor industry field, control of an ionic gaseous contaminant becomes indispensable in addition to the control of a particulate contaminant using a HEPA (High Efficiency Particulate Air) filter, a ULPA (Ultra Low Penetration Air) filter or the like, with an increase in integration degree of products. For example, amines are contained in an amount of several tens parts per billion in an atmosphere, and enter the clean room upon intake of an outside air. Further, it is known that basic gaseous contaminants such as amines are also generated from the construction materials of a clean room or the chemicals for processing.

When these basic gaseous contaminants are present in an amount of 10 to 20 ppb in a clean room, the defective shape of a photoresistance is caused (T-top phenomenon). Further, they react with an acidic gas, thereby to form a salt, so that fogging is caused on the surface of an optical component of a processing device or a silicon wafer. For this reason, an adsorption filter carrying an acidic substance as a reactive material for absorbing a gas is used to remove basic gaseous contaminants such as amines.

On the other hand, when acidic gaseous contaminants are present in a clean room, they corrode the glass fiber of a dust collecting filter, thereby to promote the generation of boron, and to bring about a metal corrosion of IC or the like. In order to take measures against such acidic gaseous contaminants, an adsorption filter carrying a basic substance as a reactive material for absorbing a gas is used to remove the acidic gaseous contaminants.

The adsorption filter may be used in such a manner as to be set in a clean booth or a ceiling-mounted FFU (Filter Fan Unit), or in such a manner as to be set in a semiconductor-manufacturing apparatus. In such a case, the reduction in thickness of the adsorption filter has proceeded with downsizing of an air conditioning unit.

Alternatively, the adsorption filter may be set in a return duct in a clean room, and at an outside air inlet. In this case, the adsorption filter is required to be housed in a predetermined space. On the other hand, at the return duct in the clean room, and at the outside air inlet, it is required to treat a large quantity of air containing impurities. This inevitably results in a high wind velocity in the duct. Accordingly, a small thickness filter provides a short contact time (residence time) with the air to be treated, so that a sufficient removing performance cannot be obtained. When the filter thickness is increased in order to increase the residence time, the pressure loss increases. This unfavorably causes problems of necessitating an increased capacity of an air blower, an increased blowing energy, and the like. Accordingly, there are demands for the reduction in area occupied by the filter, and the reduction in pressure loss of the air conditioning equipment system.

Therefore, as the method for satisfying the requirements for the adsorption filter for use in the return duct in the clean room, and at the outside air inlet, there is a method in which the filter surface area is increased relative to the duct opening area, thereby to increase the residence time. Specifically, there are a method in which several sheets of filters are housed in a casing, and disposed to make a plurality of V configurations (see Patent Document 1), and a method using a pleated type filter (see Patent documents 2 and 3), which are adaptable to high wind velocity (wind velocity 1 m/s to 3 m/s).

Patent Document 1: JP 9-220426 A
Patent Document 2: JP 9-239223 A
Patent Document 3: JP 7-289828 A Incidentally, when filters are of a cassette type filled with particulate activated carbon, and disposed in a V shape, according to a conventional technique, a plurality of small thickness filters are manufactured, and the filters are respectively framed, and then housed in a casing, and disposed to make a plurality of V configurations. In this case, there are the following problems: the powder falling amount and the generated dust amount are large, resulting in a contamination in a clean room; the weight is very large because an activated carbon is filled therein; framing of the filter is time-consuming; the total weight has been increased by the weight of the cassette frame; and other problems.

On the other hand, in the pleated structure, the filter medium is a felt-like or nonwoven fabric-like one. A corrugated spacer for shape keeping, or a hard porous material such as a web made of a metal or made of a hard plastic or a punching metal is generally used therefor, which causes an increase in pressure loss. Further, there is also another problem as follows: an air does not flow through the crest and valley portions of the folds, so that the filter is not consumed uniformly (see Patent Document 3). Still further, the joint portion between the spacer for shape keeping and the filter medium is required to be welded by an adhesive. Furthermore, assembling is not easy, so that the corrugated spacer and the hard porous material become industrial wastes upon disposal (see Patent Document 2).

SUMMARY OF THE INVENTION

The present invention has been completed in view of the foregoing problems. It is therefore an object of the invention to provide an adsorption filter which has a reduced pressure loss, and which enables a reduction in weight, simplification of manufacturing, uniform use of the filter, and easy assembling.

Another object of the invention is to provide a method for manufacturing the adsorption filter.

Other objects and effects of the invention will become apparent from the following description.

The foregoing objects of the present invention have been achieved by providing the following adsorption filters and manufacturing method.

1) An adsorption filter, comprising:
at least one thin plate honeycomb filtering medium carrying a gas-adsorbing medium thereon; and
a filter case housing the honeycomb filtering medium therein, wherein the thin plate honeycomb filtering medium is disposed in the filter case in such a manner as to make a series of V configurations with respect to a ventilation direction.

With the adsorption filter having this configuration, V-shaped disposition results in an increase in filter effective surface area relative to the filter case opening area. Therefore, the pressure loss of the adsorption filter is reduced as compared to the case where ventilation is effected perpendicular to the filter. This adsorption filter is adaptable to high wind velocity (1 m/s to 3 m/s).

2) The adsorption filter according to the item 1) above, wherein the series of V configurations is formed by one thin plate honeycomb filtering medium carrying a gas-adsorbing medium thereon.

For forming the series of V configurations by one thin plate honeycomb filtering medium, incisions are made in a honeycomb structure block in parallel to the ventilation direction and the ventilation backflow direction of the filter. (In terms of the honeycomb filter itself, incisions are made perpendicular to the honeycomb flute direction.) The incisions are made from the front side and the back side in a staggered manner, leaving about 1 mm to 10 mm relative to complete cutting. The incised honeycomb filtering medium is pulled at the both ends and housed in the casing in an extended state.

In this way, it becomes possible to dispose one sheet of filter to make a series of V configurations. This enables a low pressure loss of the adsorption filter, a reduction in weight, and a simplification of manufacturing. Further, no filter frame is required, resulting in no portion where ventilation is not effected due to a filter frame. Thus, it is possible to use the filter effectively.

3) The adsorption filter according to the item 1) above, wherein the series of V configurations is formed by a plurality of thin plate honeycomb filtering media each carrying a gas-adsorbing medium thereon, wherein each apex portion of the V configurations is made by adjacent two of the plural honeycomb filtering media.

For forming the series of V configurations by a plurality of thin plate honeycomb filtering media, a honeycomb structure block itself is cut in the direction perpendicular to the honeycomb flute direction to obtain a plurality of filter sections. After cutting, the respective filter sections are housed in the filter case, and disposed to make a series of V configurations. When the honeycomb filtering medium is not self-standing by a fixing member, air leak between the filter and the filter case can be prevented with an adhesive or the like, or a resin foamed product and an adhesive or the like. When the honeycomb filtering medium is self-standing by a fixing member, air leak can be prevented by a resin foamed product.

Further, the honeycomb structure product has high strength, and a self-standing property. For this reason, it does not require a member such as a corrugated spacer or a hard porous product, and it is easy to mount.

4) The adsorption filter according to any one of the items 1) to 3), wherein the gas-adsorbing medium comprises at least one member selected from an activated carbon, zeolite, an ion exchange resin, an inorganic base, an acidic inorganic salt, and an inorganic acid.

With the adsorption filter having this configuration, it is possible to remove at least one component of a cohesive organic substance in an air, a basic gas, and an acidic gas.

5) The adsorption filter according to any one of the items 1) to 4), wherein the honeycomb filtering medium comprises a fibrous substrate.

With the adsorption filter having this configuration, it is possible to carry a large quantity of an adsorbing medium in the pores and on the surface of the fibrous substrate, which enables the improvement of the removing performance.

6) The adsorption filter according to any one of the items 1) to 5), wherein the thin plate honeycomb filtering medium is self-standing by a fixing member formed in the filter case.

With the adsorption filter having this configuration, the honeycomb filtering medium can be positioned to be self-standing by the fixing member. For this reason, the honeycomb filtering medium can be stably housed in the filter case.

7) The adsorption filter according to the item 6), wherein the fixing member fixes the thin plate honeycomb filtering medium without any bonding agent.

With the adsorption filter having this configuration, the honeycomb filtering medium is fixed by the fixing member without using an adhesive or the like. Therefore, in contrast to the case using a bonding agent such as an adhesive, no out gas is generated, which enables the inside of the clean room to be kept clean.

8) The adsorption filter according to the item 6) or 7), wherein the filter case has a groove or protrusion serving as the fixing member for fixing the thin plate honeycomb filtering medium, and further has slits in accordance with an opening width of the respective V-configuration formed by the thin plate honeycomb filtering medium.

With the adsorption filter having this configuration, the honeycomb filtering medium is fixed by the groove or the protrusion of the filter case having slits, and hence other components are not required in contrast with fixing through screwing or the like. Therefore, there is no possibility of an increase in number of components.

9) A method for manufacturing an adsorption filter, comprising:

disposing a thin plate honeycomb filtering medium carrying a gas-adsorbing medium thereon in such a manner as to make a series of V configurations with respect to a ventilation direction; and housing the honeycomb filtering medium in a filter case by interposing each apex portion of the V-configurations formed by the honeycomb filtering medium into a fixing portion formed by a fixing member formed in a filter case.

With the method for manufacturing the adsorption filter having this configuration, for the incorporation of the honeycomb filtering medium into the filter case, it is required only that the honeycomb filtering medium is interposed into a fixing portion formed by the fixing member to thereby be housed in the filter case. Therefore, the method is simple and requires no specific skill, which can improve the workability.

In accordance with the adsorption filter and the manufacturing method thereof of the present invention, a pressure loss of an adsorption filter is reduced, and further reduction in weight, simplification of manufacturing, uniform use of the filter, and easy mounting are attained.

The adsorption filter of the present invention can be used as an airborn molecular contaminant filter, an odor removal filter, etc.

Figure 1:
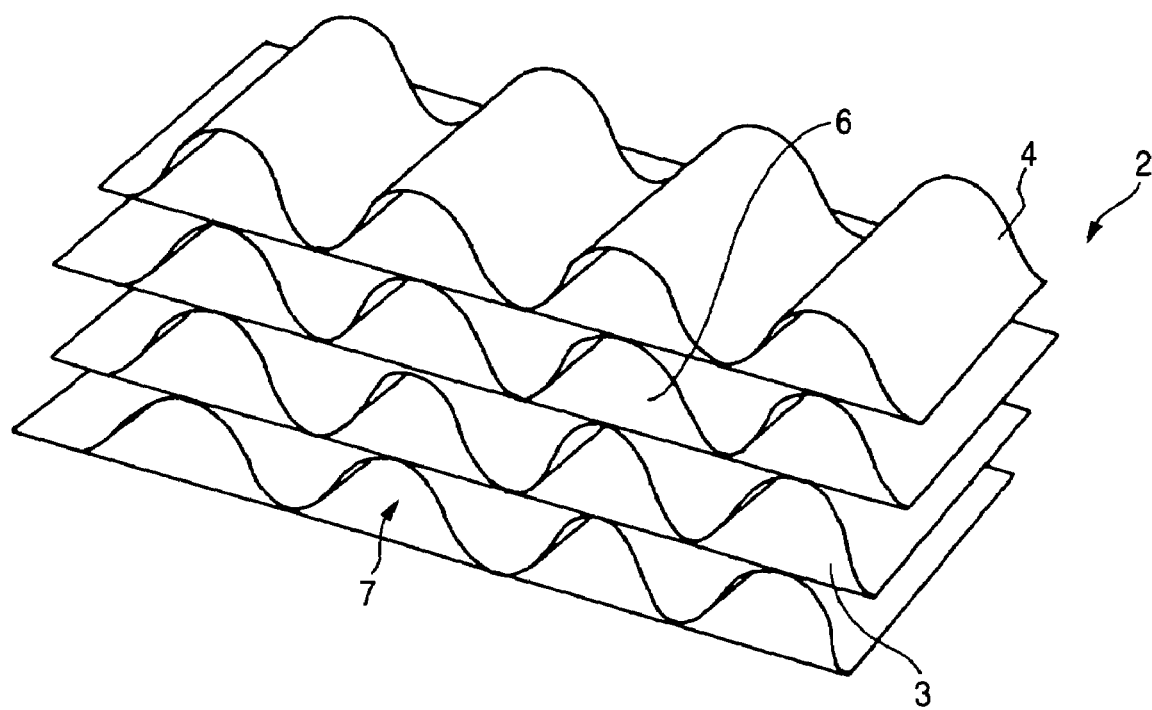
FIG. 1 is a schematic perspective view of a corrugated honeycomb filtering medium for use in the present invention.

The reference numerals and signs used in the drawings denote the followings, respectively.

2: Corrugated honeycomb filtering medium
2a: Folding portion (apex portion)
3: Flat fibrous substrate (flat product)
4: Corrugated fibrous substrate (corrugated product)
5: Crest
6: Cavity
7: Opening
8: Incision
9: Casing (filter case)
10, 11: Separator
12, 13: Projecting portion
29, 33: Slit
31, 34: Protrusion (fixing member)
38, 39: Concave groove (fixing member)
t: Wall thickness
h: Cell height
p: Pitch
D: Incision interval
E: Non-incised residual length

DETAILED DESCRIPTION OF THE INVENTION

In an adsorption filter and a manufacturing method thereof of the present invention, an adsorption filtering medium has no particular restriction so long as it comprises a fibrous substrate with an interfiber porosity of, usually, 80 to 95% and a gas-adsorbing medium carried thereon, and has a corrugated honeycomb structure.

The fibrous substrate denotes a woven fabric or nonwoven fabric formed of a fiber. The fiber include inorganic fibers and organic fibers. The inorganic fiber includes glass fibers such as E glass fiber, NCR fiber, ARG fiber, ECG fiber, S glass fiber and A glass fiber, chopped strand, ceramic fiber, alumina fiber, mullite fiber, silica fiber, rock wool fiber, carbon fiber, and the like. The organic fiber includes aramid fiber, nylon fiber, polyethylene terephthalate fiber, and the like. The inorganic fibers and the organic fibers have no particular restriction on the shape and the like. However, the fiber length is preferably 0.1 to 50 mm, and the fiber diameter is preferably 0.1 to 25 μm. The inorganic fibers and the organic fibers may be used singly, or in combination of two or more thereof. The fibrous substrate preferably comprises an inorganic fiber and an organic fiber in combination from the viewpoints of increasing the strength of the adsorption filter, and imparting the flexibility thereto.

The interfiber porosity of the fibrous substrate on which the gas-adsorbing medium is carried is usually 80 to 95%, and preferably 90 to 95%. In the case where the interfiber porosity of the fibrous substrate falls within the foregoing range, when an activated carbon or zeolite which is a gas-adsorbing medium described later is held in the interfiber pores, it is possible to fill the interfiber pores with an activated carbon or zeolite in such a high ratio as to close the interfiber pores. The interfiber porosity denotes the ratio of the portion (volume of the pore portion) obtained by subtracting the volume occupied by the fiber in the fibrous substrate from the apparent volume of the fibrous substrate, with respect to the apparent volume.

The gas adsorption media include a gas adsorption material and a gas reactive material.

The gas adsorption material includes an activated carbon or zeolite. The activated carbon or zeolite is used for the purpose of adsorbing a cohesive organic substance. The adsorption filter for adsorbing a cohesive organic substance using an activated carbon or zeolite as an adsorption material physically adsorbs the cohesive organic substance in the pores of activated carbon or zeolite by the van der Waals force, and hence it does not require an impregnation substance such as an acid or a base.

The gas reactive material includes a reactive material for absorbing an acidic gas or a reactive material for absorbing a basic gas. As the reactive material for absorbing an acidic gas, a wide variety of alkaline inorganic salts and anion exchange resins may be used. Examples of such inorganic salts include alkali salts such as potassium carbonate. Examples of the anion exchange resins include strongly basic anion exchange resins. As the reactive material for absorbing a basic gas, a wide variety of inorganic acids, acidic inorganic salts, and cation exchange resins may be used. As the inorganic acids, mention may be made of sulfuric acid and the like. As the acidic inorganic salts, mention may be made of sulfates such as iron sulfate. Further, examples of the type of the cation exchange resin may include strongly acidic cation exchange resins.

On the fibrous substrate with an interfiber porosity of 80 to 95%, an activated carbon, zeolite, or an ion exchange resin powder is carried so that the amount thereof to be carried per unit area of the fibrous substrate falls within the range of usually 40 to 200 g/m$^2$, preferably 60 to 150 g/m$^2$, and particularly preferably 80 to 150 g/m$^2$. The carrying method is preferably a method for coating a suspension of a powdered activated carbon, zeolite or an ion exchange resin, with a binder because the method is capable of providing an activated carbon or the like in such a manner as to fill the interfiber pores, and enabling a gas adsorption material and/or a gas reactive material to be carried in a high ratio.

The activated carbon-, zeolite-, or ion exchange resin-carrying fibrous substrate is formed into a corrugated honeycomb structure block. First, the activated carbon-, zeolite-, or ion exchange resin-carrying fibrous substrate is divided into a portion to be corrugated and a portion not to be corrugated. The portion to be corrugated is caused to pass through a pair of upper and lower corrugated rolls, thereby providing a corrugated product. An adhesive is applied to the crest portions of the corrugated product. The flat product not corrugated is stacked thereon, and the adhesion is established at the contact portion between the crest portions of the corrugated product and the flat product. The adhesion is established alternately between a plurality of the corrugated products and a plurality of the flat products for lamination. As a result, it is possible to form a honeycomb structure block having a prescribed opening ratio with respect to the ventilation direction. The cross sectional shape of the honeycomb structure block has no particular restriction, and examples thereof include a circular shape and a rectangular shape.

According to need, a gas reactive material is further carried on the thus prepared corrugated honeycomb structure block. As the gas reactive material, the above-mentioned gas reactive materials may be used. As the adsorption filtering medium carrying a gas reactive material on the corrugated honeycomb structure block, one impregnated with a substance such as an acid or an alkali is used according to the intended use. Namely, when the gaseous contaminants are basic gases, examples of the gas reactive material usable include those impregnated with an acidic compound. When the gaseous contaminants are acidic, examples of the gas reactive material include those impregnated with a basic compound.

As the kind of the gas reactive material and the gas adsorption material, and the impregnation and carrying method thereof, any known kinds and methods are applicable. For example, an adsorption filtering medium containing an acid as a gas reactive material can be obtained in the following manner. For example, the honeycomb structure block is dipped in an aqueous solution with a sulfuric acid concentration of several percent to ten-odd percent for several minutes to several hours, or allowed to undergo water absorption carrying by wash coat or the like, followed by drying. Further, for example, an adsorption filtering medium containing an alkali as a gas reactive material can be obtained in the following manner. For example, the honeycomb structure block is dipped in an aqueous solution with a potassium carbonate concentration of several percent to ten-odd percent for several minutes to several hours, or allowed to undergo water absorption carrying by wash coat or the like, followed by drying.

As a solvent to be used for the solution of the gas reactive material, water, alcohol, or the like is appropriately selected and used. Incidentally, the dipping treatment or the wash coating treatment may be carried out two times or more respectively, or in combination. By repeating these treatments, it is possible to carry a larger amount of the gas reactive material. The amount of the gas reactive material to be carried based on the amount of the fibrous substrate which is an adsorption filtering medium is, for example, preferably 5 to 30 kg/m$^3$ when sulfuric acid is used for the purpose of removing an alkaline contaminant, and is preferably 30 to 60 kg/m$^3$ when potassium carbonate is used for the purpose of removing an acidic contaminant.

When an ion exchange resin is used as a gas reactive material, it is not required to be dipped in an aqueous solution of an inorganic salt, and nor to be allowed to undergo wash absorption carrying by wash coat or the like, because the ion exchange resin by itself can remove a gaseous contaminant. In the invention, the ion exchange resin powder preferably contains any one of a cation exchange resin powder and an anion exchange resin powder, because it is capable of removing basic gases (such as ammonia and amines) or acidic gases (such as $SO_x$ and $NO_x$), or both.

The ion exchange resin powder has an ion exchange capacity of generally 1 to 10 meq/g, and preferably 3 to 6 meq/g. When the ion exchange capacity is less than 1 meq/g, the reaction amount with the ionic gaseous contaminants is reduced, and the gas removing performance tends to be reduced. When the ion exchange capacity exceeds 10 meq/g, the chemical stability of the ion exchange resin constituting the ion exchange resin powder is inferior. Accordingly, the exchange groups tend to leave from the ion exchange resin powder itself, which may possibly serve as an out gas.

The adsorption filter of the invention comprises a honeycomb structure product and a casing.

Figure 3:
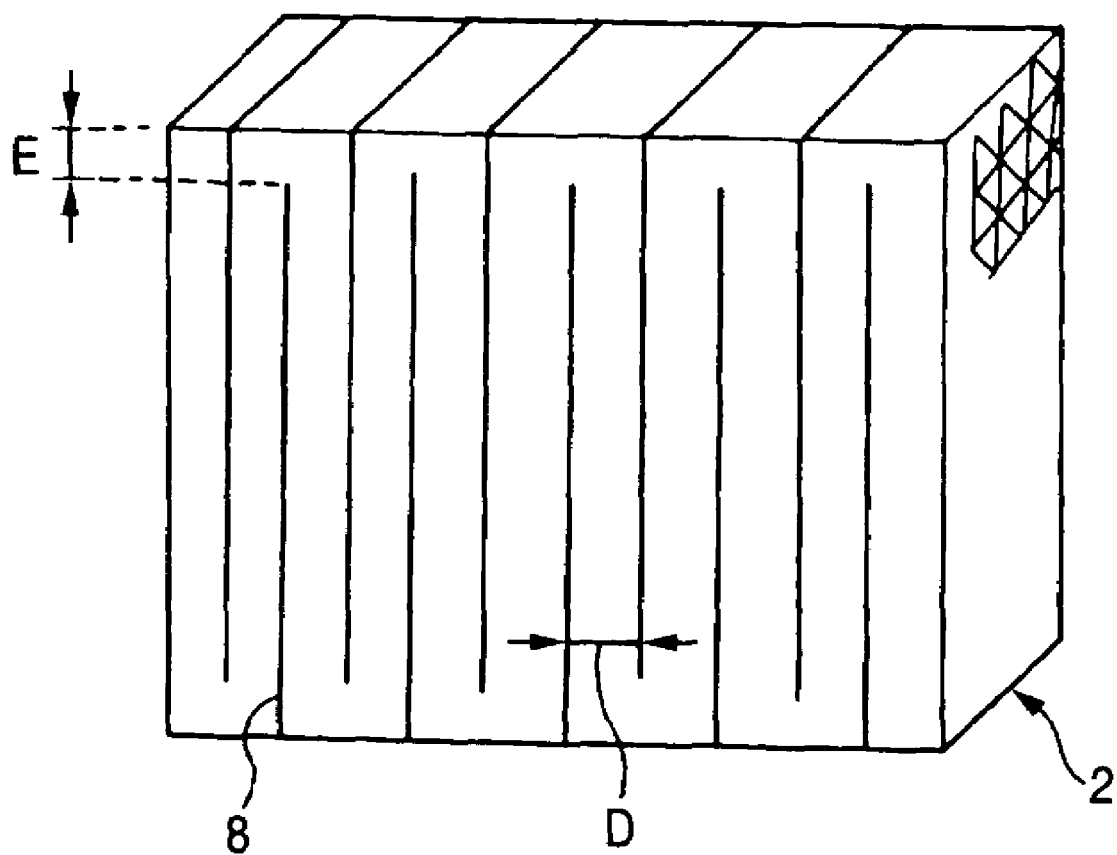
FIG. 3 is a simplified view of a corrugated honeycomb filtering medium for use in the invention, in which incisions have been made.
Figure 4:
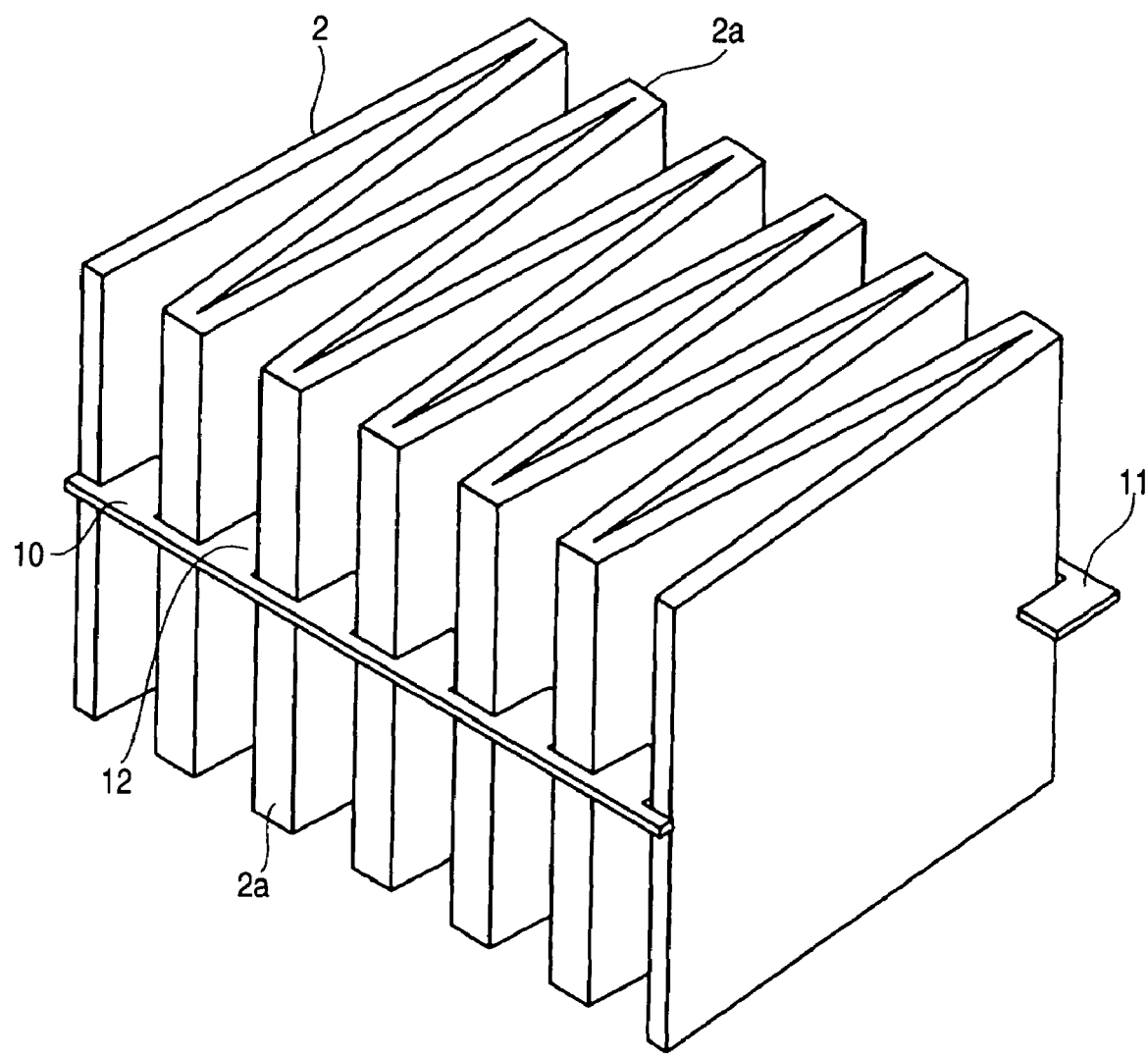
FIG. 4 is a perspective view of an outside appearance of a corrugated honeycomb filtering medium for use in the invention, which has been extended, and to which separators have been inserted.
Figure 5:
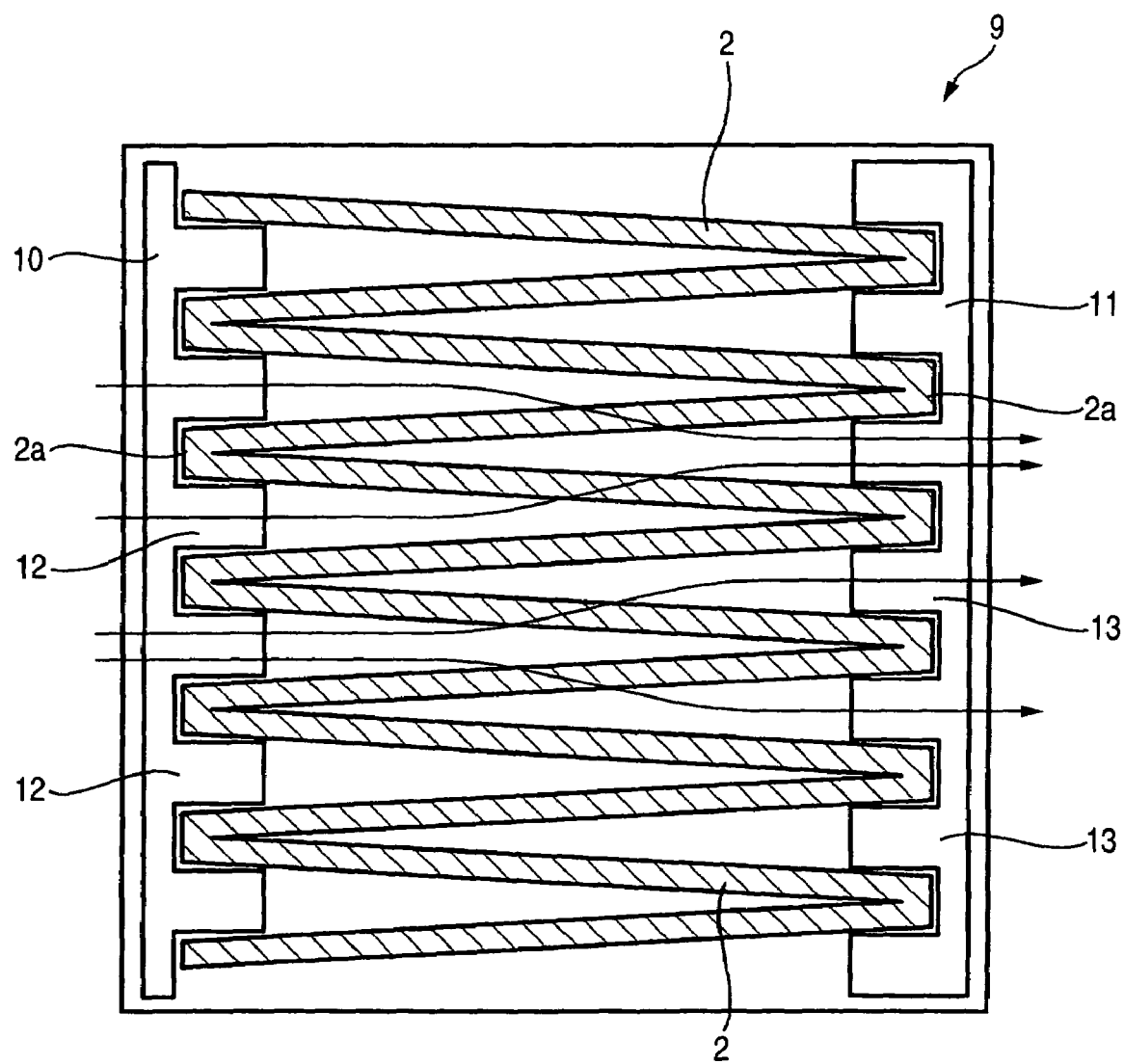
FIG. 5 is a cross sectional view of a corrugated honeycomb filtering medium for use in the invention, which has been housed in a casing.

An example of the method for mounting the honeycomb structure product into a casing 9 for the case where the series of V configurations is to be formed by a single honeycomb filtering medium is shown in FIGS. 3 to 5. First, incisions 8 are made in a honeycomb structure block in parallel to the ventilation direction and the ventilation backflow direction of the filter unit. (In terms of the honeycomb structure block itself, incisions are made vertically to the flute direction.) The incisions 8 are made from the front side and the back side in a staggered manner, leaving about 1 to 10 mm (non-incised residual length E) relative to complete cutting.

Then, the honeycomb filtering medium 2 which has been incised is pulled at the both ends, and extended. In this state, a first separator 10 is horizontally inserted into the upstream-side V-shaped spaces generated by the extension. Similarly, a second separator 11 is horizontally inserted into the downstream-side V-shaped spaces. Namely, in the first separator 10, projecting portions 12 each having the lateral width in agreement with the width dimension between the adjacent folding portions (apex portions) 2a of the honeycomb filtering medium 2 are formed. Insertion of each projecting portion 12 into the V-shaped space ensures a prescribed extended state of the honeycomb filtering medium 2.

The second separator 11 is formed in substantially the same shape as with the first separator 10, and disposed opposite to the first separator 10. Namely, as shown in FIG. 5, the projecting portions 12 of the first separator 10 and the projecting portions 13 of the second separator 11 are disposed in a staggered configuration in accordance with the pitch of the adjacent folding portions (apex portions) 2a of the honeycomb filtering medium 2. Thereby, a single honeycomb filtering medium 2 configured to make a series of V shapes can be stably housed in the casing 9.

Incidentally, when the non-incised residual length E is less than 1 mm, the filtering medium may be broken when housed in the casing 9, thus being not preferred. When the non-incised residual length E has a length more than 10 mm, the filtering medium cannot be extended smoothly and hence may be torn at the incisions 8 when housed, thus being not preferred.

The fibrous substrate of the honeycomb structure product for use in the invention has strength and flexibility. Therefore, the non-incised residual length E is preferably 2 to 5 mm, which enables the filter to be extended without breakage.

The interval D between the filter incisions 8 shown in FIG. 3 can be set according to the use conditions, and it is usually 5 to 80 mm, and preferably 10 to 20 mm. When the incision interval D is less than 5 mm, the space between the filter portions after the disposition in a series of V configurations becomes narrow. As a result, wind may not flow uniformly, resulting in nonuniform consumption of the filter. When the incision interval is longer than 80 mm, the effective surface area of the filtering medium relative to the filter case opening area is reduced. Accordingly, the velocity of wind passing through the filter is increased, which may unfavorably results in an increase in pressure loss.

An example of the method for mounting the honeycomb structure product into a casing for the case where the series of V configurations is to be formed by a plurality of honeycomb filtering media is described below. First, the honeycomb structure block is cut perpendicular to its flute direction to obtain a plurality of filter sections. The cut interval can be set according to the use conditions. The thickness of the filter sections obtained by cutting is usually 5 to 80 mm, and preferably 10 to 20 mm. When the filter section thickness is smaller than 5 mm, and the filter is configured in a series of V shapes, the space between the adjacent filter sections becomes narrow. As a result, wind may not flow uniformly, resulting in nonuniform consumption of the filter. When the filter section thickness is larger than 80 mm, the effective surface area of the filtering medium relative to the filter case opening area is reduced. Accordingly, the velocity of wind passing through the filter is increased, which may unfavorably results in an increase in pressure loss.

For the joint portions between the adjacent filter sections, the adhesive described later may be used in order to prevent air leak.

The casing has functions of supporting the corrugated honeycomb structure product and providing a junction with the existing equipment (installation site). The treated air flowing portion of the casing is made of a material that does not undergo degassing such as stainless steel, aluminum, galvanium steel plate, or plastic.

For the joint portion between the honeycomb structure product disposed in a series of V shapes and the casing, either or both of a resin foamed product, and an adhesive or the like may be used for air leak prevention. As the resin foamed product, an urethane foamed product, a polyethylene foamed product, a fluororesin foamed product, or a silicon rubber can be used. No particular restriction is imposed on the kind of the resin foamed product. However, a low out gas fluororesin foamed product is preferred. As the adhesive, a silicone sealant, a hot melt type adhesive, an epoxy-based adhesive, an urethane-based adhesive, or the like can be used. Although no particular restriction is imposed on the kind of the adhesive, a low out gas epoxy-based adhesive is preferred.

The resin foamed product is used in such a manner as to be interposed between the casing and the honeycomb structure product. Thus, the foamed product is squashed upon mounting, and hence no air leak is caused. The honeycomb structure product is characterized in that the foregoing technique can apply thereto because it has high strength and it is a self-standing product. The honeycomb structure product is also preferred because it can be mounted and demounted more easily upon disposal of the filtering medium than the case of welding with an adhesive.

The installation site of the adsorption filter of the invention has no particular restriction. However, for example, the adsorption filter is used for the purpose of air cleaning in the clean room or at the outside air inlet of a semiconductor-manufacturing plant or a precision electronic devices-manufacturing plant. It is excellent in gaseous contaminant-removing performance, and enables a low pressure loss of an adsorption filter, reduction in weight thereof, and simplification of manufacturing thereof.

Then, by reference to FIGS. 6 to 8, a detailed description will be given to the assembling of the adsorption filter in accordance with the invention.

Figure 6:
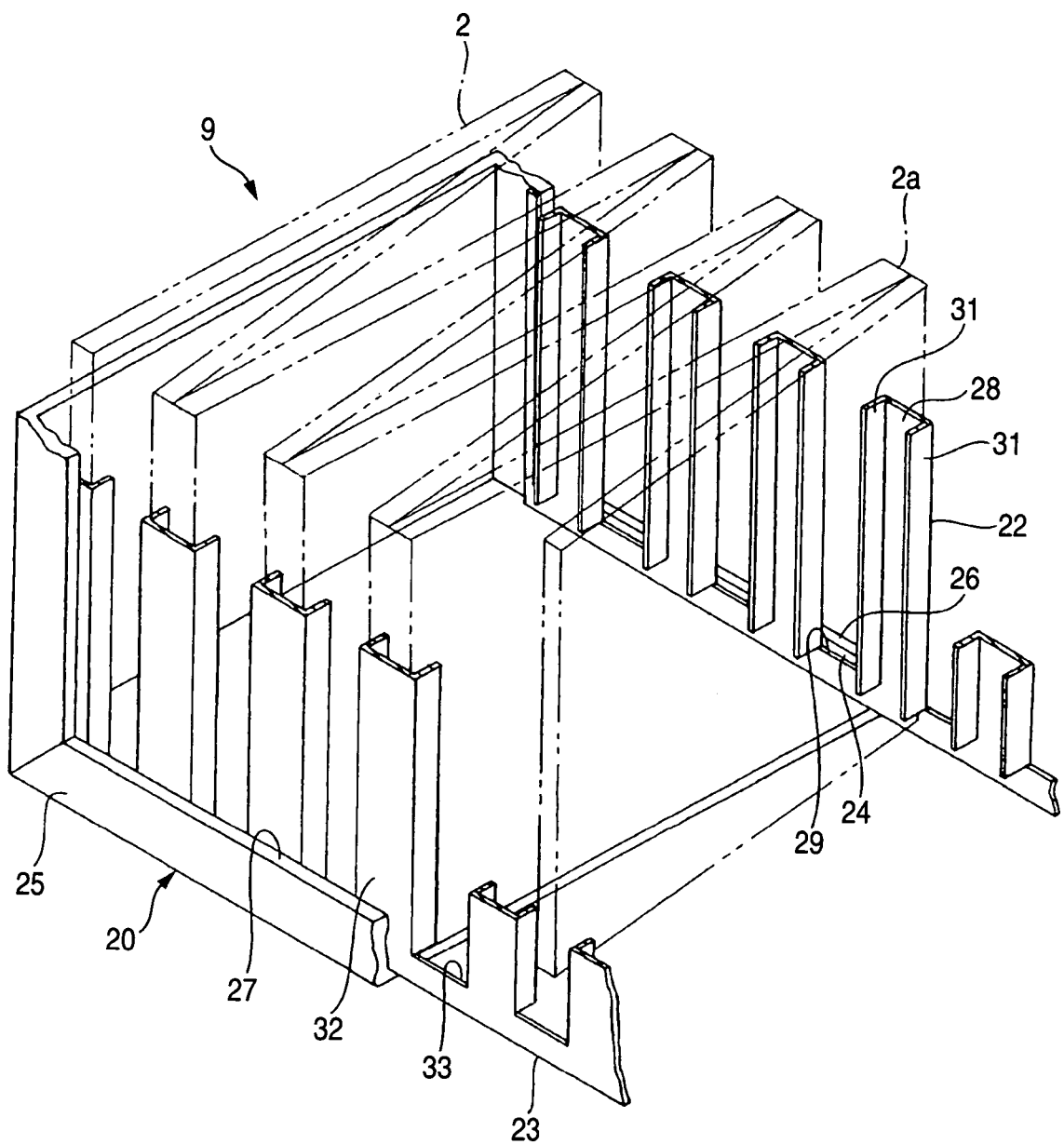
FIG. 6 is a partly broken perspective view of an outside appearance of a casing for use in the adsorption filter of the invention.

FIG. 6 is a partly broken perspective view of the outside appearance of a casing for use in the adsorption filter. FIG. 7 is a horizontal cross sectional view of FIG. 6. FIG. 8 is an exploded perspective view of each component showing a manufacturing method of the adsorption filter.

As shown in FIG. 6, a casing 9 comprises a case main body 20 formed in a U shape totally, a lid member (shown in FIG. 8) 21 to be mounted on the case main body 20, a first ventilation plate 22 to be disposed in the upstream side of the casing 9, and a second ventilation plate 23 to be disposed in the downstream side of the casing 9.

The case main body 20 is formed of a thin plate member made of, for example, aluminum, and has been subjected to an alumite treatment. The case main body 20 has, on the opposite side ends, side edges 24 and 25 made by folding processing, and has openings 26 and 27 inside the side edges 24 and 25. The case main body 20 is opened at the top.

The first ventilation plate 22 is formed of the same plate member made of aluminum as that of the case main body 20, and it has been subjected to an alumite treatment. In the first ventilation plate 22, a plurality of slits 29 are alternately formed via a plurality of pole units 28. Then, on each pole unit 28, there are formed a pair of protrusions 31 each in the form of a plate, serving as a fixing member. Each pair of the protrusions 31 has a protrusion-to-protrusion distance that is slightly larger than the width dimension of the folding portion (apex portions) 2a formed by a single honeycomb filtering medium 2, and protrudes toward the inside of the case main body 20. Each slit 29 has a width dimension in accordance with the dimension between the adjacent folding portions (apex portions) 2a of the honeycomb filtering medium 2 configured in a series of V shapes, i.e., in accordance with the opening width of the V-configuration.

The second ventilation plate 23 is formed similarly to the first ventilation plate 22, and disposed opposite to the first ventilation plate 22. The second ventilation plate 23 has a plurality of pole units 32, a plurality of slits 33, and protrusions 34 similarly to the first ventilation plate 22.

Figure 7:
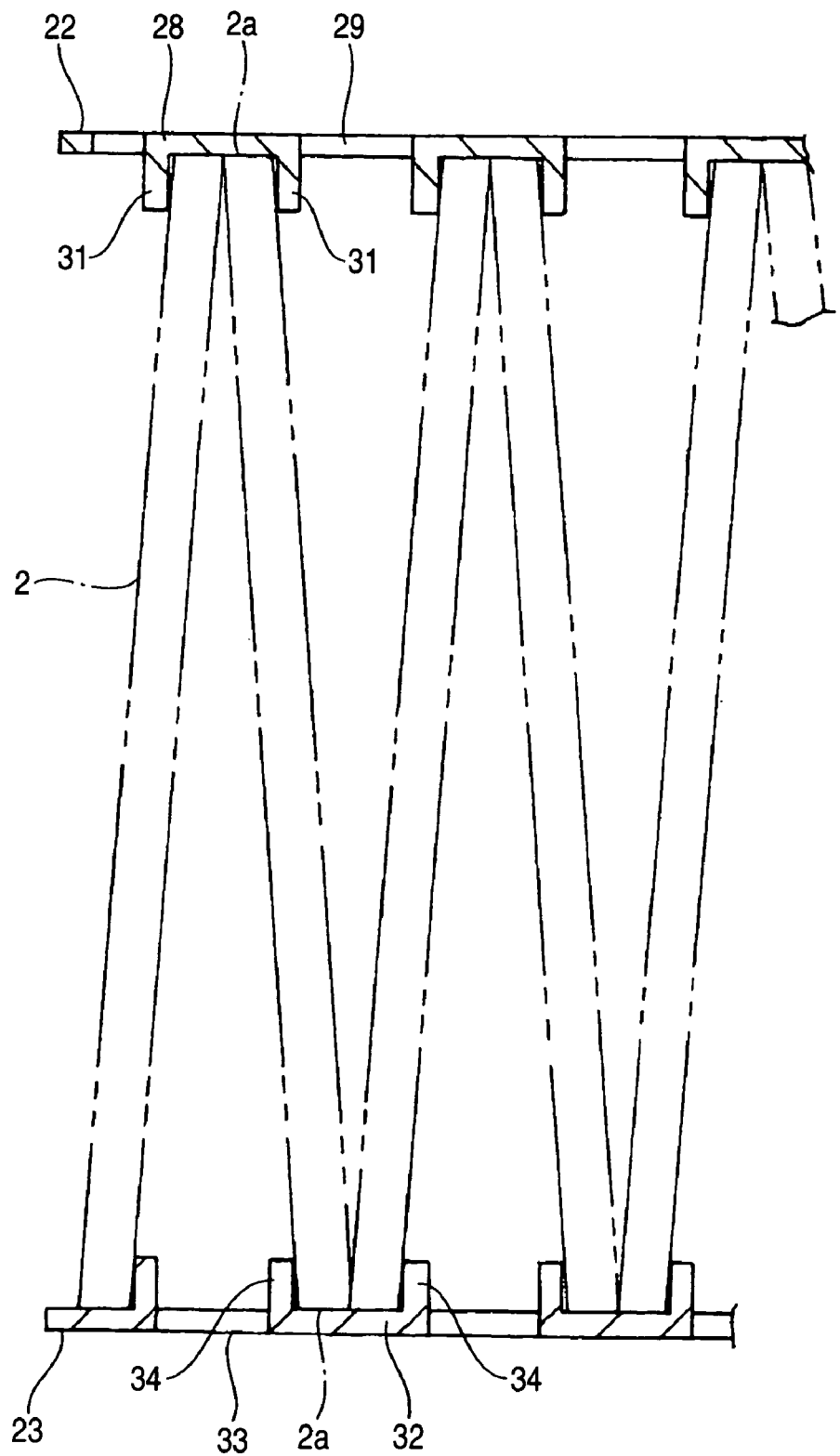
FIG. 7 is a horizontal cross sectional view of FIG. 6.

As shown in FIG. 7, the pole units 28 of the first ventilation plate 22 and the pole units 32 of the second ventilation plate 23 are disposed in a staggered configuration in accordance with the pitch of the folding portions (apex portions) 2a of the honeycomb filtering medium 2. With this configuration, the honeycomb filtering medium 2 is inserted between both the ventilation plates 22 and 23 from the upper side of the case main body 20. As a result, each folding portion (apex portion) 2a on the upstream side of the honeycomb filtering medium 2 is inserted in between a pair of the protrusions 31 in each pole unit 28 of the first ventilation plate 22. In addition, each folding portion (apex portion) 2a on the downstream side of the honeycomb filtering medium 2 is inserted in between a pair of the protrusions 34 in each pole unit 32 of the second ventilation plate 23. In consequence, the honeycomb filtering medium 2 is housed in the case main body 20 in a self-standing manner without being bonded thereto, and not through any bonding agent such as an adhesive. The honeycomb filtering medium 2 is positioned to be self-standing by the respective protrusions 31 and 34. For this reason, the honeycomb filtering medium 2 can be housed stably in the casing 9.

Further, since it is possible to fix the honeycomb filtering medium 2 without using an adhesive or the like, no out gas is generated. This enables the inside of the clean room to be kept clean. In the case where the series of V configurations is to be formed by a plurality of honeycomb filtering media 2, even if a defective dimension is caused, it can be removed simply. For this reason, it is possible to provide media having a high dimensional accuracy. Further, it is possible to largely reduce the number of the components because no separator is required. Furthermore, it can overcome a trouble that chips accumulate between the folding portions, and are difficult to remove. Therefore, it is possible to shorten the process of blowing the chips.

Figure 8:
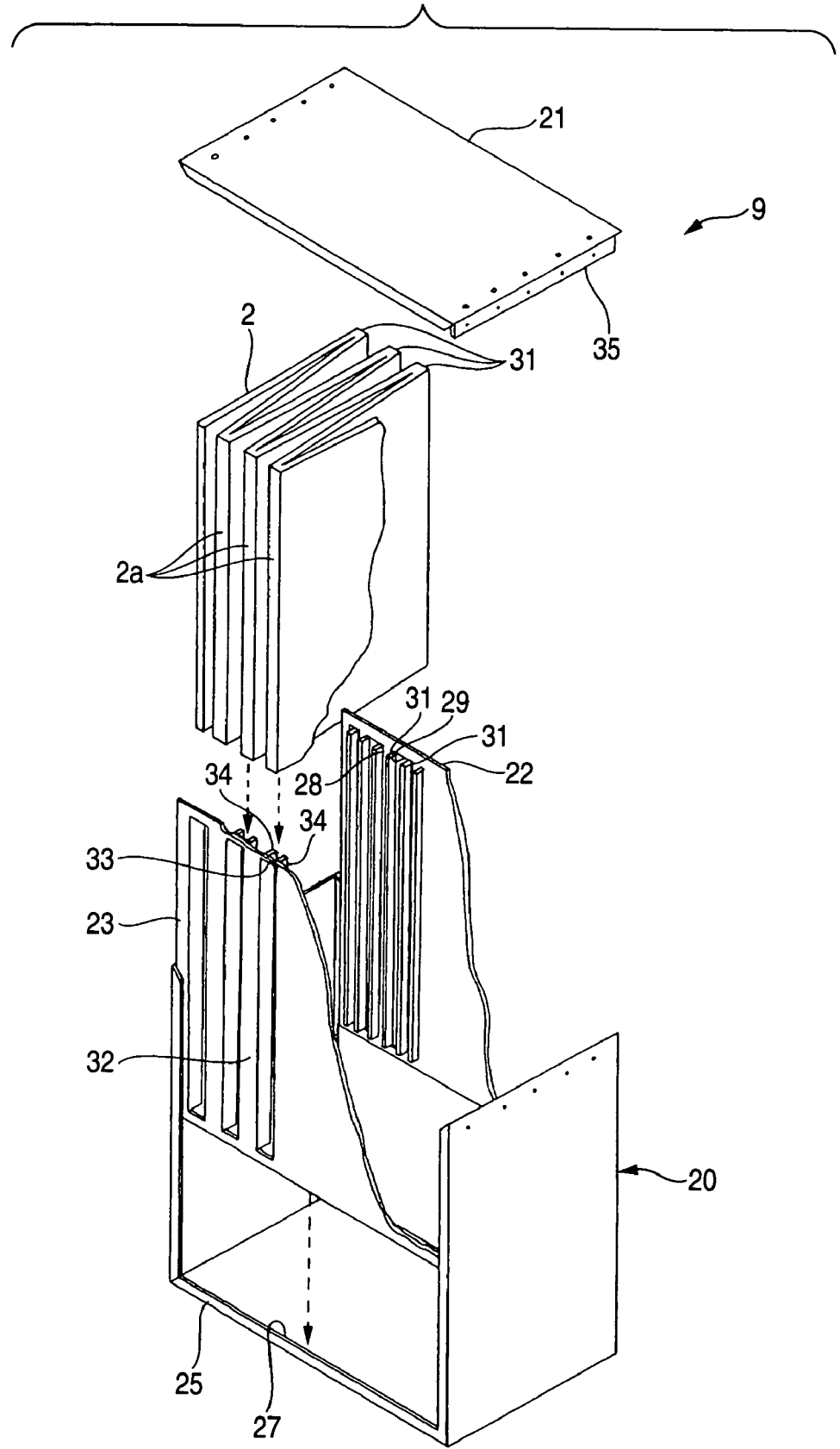
FIG. 8 is an exploded perspective view of respective components showing a manufacturing method of the adsorption filter of the invention.

As shown in FIG. 8, for assembling such an adsorption filter, the respective ventilation plates 22 and 23 are dropped into the side-end portions of the case main body 20 in the sides of the openings 26 and 27. Then, each folding portion (apex portion) 2a on the upstream side of the honeycomb filtering medium 2 is inserted in between a pair of the protrusions 31 of each pole unit 28 of the first ventilation plate 22; and each folding portion 2a on the downstream side of the honeycomb filtering medium 2, in between a pair of the protrusions 34 of each pole unit 32 of the second ventilation plate 23.

Then, a lid member 21 is combined with the upper open part of the case main body 20. Screws (not shown) are screwed from both side portions of the case main body 20 into respective brackets 35 screwed to both side portions of the lid member 21, thereby to fix the lid member 21 to the case main body 20. The first and second ventilation plates 22 and 23 fix the honeycomb filtering medium 2 by the respective protrusions 31 and 34, and hence other components are not required in contrast with screwing or the like. Therefore, there is no possibility of an increase in number of components. The air flow is effected through the respective slits 29 and 33 of the respective ventilation plates 22 and 23.

Figure 9:
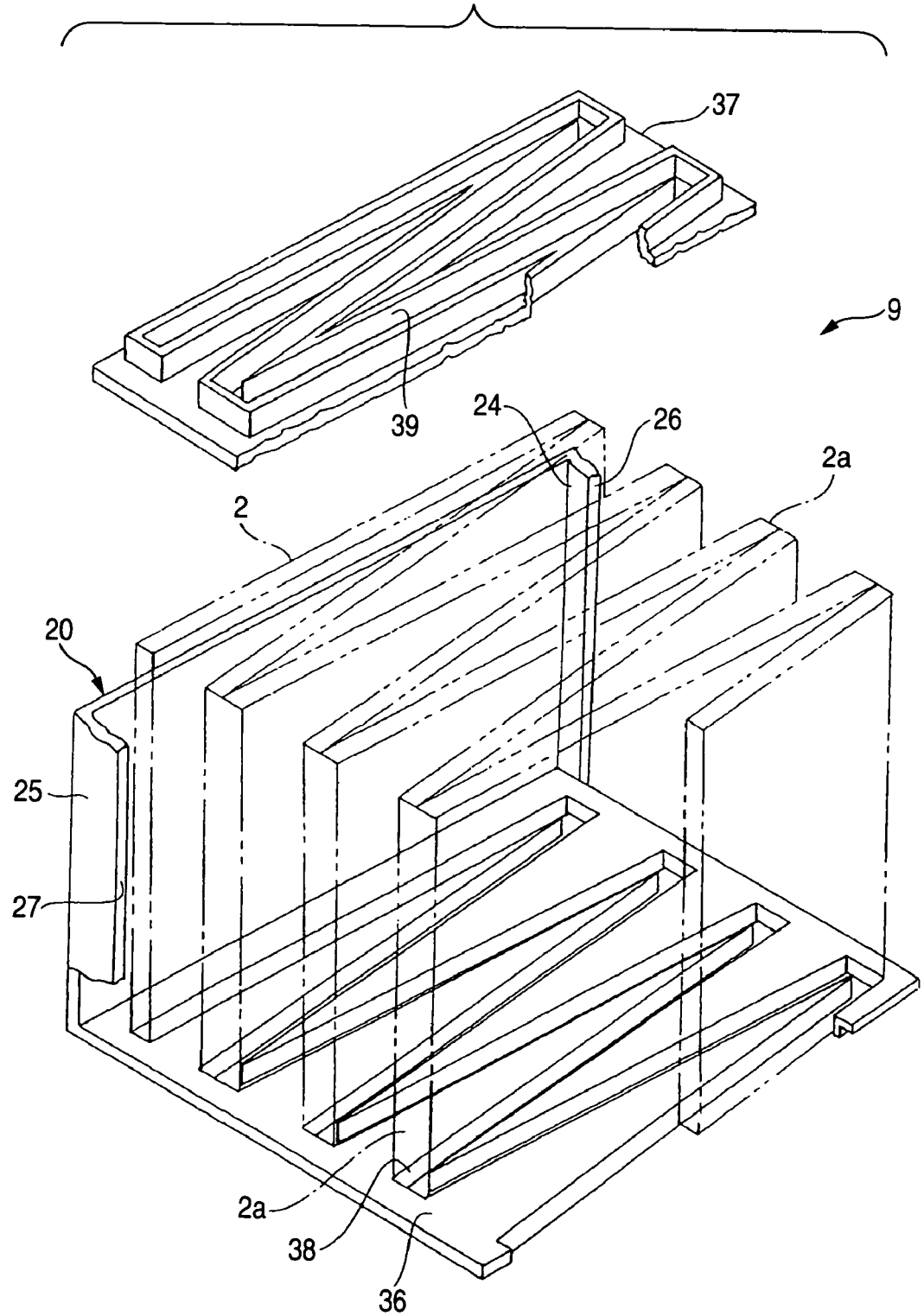
FIG. 9 is a partly broken perspective view of an outside appearance of a modified example of the casing for use in the adsorption filter of the invention.

Then, a description will be given to a modified example of the adsorption filter of the invention by reference to FIG. 9. FIG. 9 is a partly broken perspective view of the outside appearance of a modified example of the casing for use in the adsorption filter.

As shown in FIG. 9, in the casing 9 of this modified example, there are formed, on the bottom plate 36 and the lid member 37 (shown in a reversed state in the drawing) of the case main body 20, concave grooves 38 and 39 in the V groove form, each of which continuously extends in accordance with the series of V shapes of the honeycomb filtering medium 2, and serves as a fixing member. The concave groove 38 of the bottom plate 36 and the concave groove 39 of the lid member 37 are formed symmetrically with each other. In this case, the air flow is effected through the openings 26 and 27 inside the side edges 24 and 25.

In this modified example, the honeycomb filtering medium 2 is inserted from the upper side of the case main body 20 into the case main body 20, so that the lower end of the honeycomb filtering medium 2 is dropped in the concave groove 38 of the bottom plate 36. Then, the lid member 37 is fixed to the upper open part of the case main body 20, so that the upper end of the honeycomb filtering medium 2 is incorporated in the concave groove 39 of the lid member 37. In consequence, the honeycomb filtering medium 2 is housed in the case main body 20 in a self-standing manner without being bonded thereto, and not through any bonding agent such as an adhesive. Therefore, no out gas is generated, which enables the manufacturing process to be kept clean. Further, the honeycomb filtering medium 2 is allowed to be self-standing, and hence, the honeycomb filtering medium 2 can be housed stably in the casing 9.

As described above, with the adsorption filter of the present invention, the configuration in the shape of V results in an increase in filter effective surface area relative to the opening area of the casing 9, which can reduce the pressure loss of the adsorption filter as compared with the case where ventilation is effected perpendicular to the filtering medium.

Further, with the adsorption filter of the present invention, it becomes possible to dispose one sheet of filtering medium to make a series of V configurations. This enables a low pressure loss of an adsorption filter, reduction in weight, and simplification of manufacturing. Further, no filter frame is required, resulting in no portion where ventilation is not effected due to the filter frame. Thus, it is possible to use the filter effectively. Moreover, when the series of V configurations is formed by a plurality of filtering media, the honeycomb filter itself is cut in the direction perpendicular to the honeycomb flute direction to obtain a plurality of filter sections. After cutting, the respective filter sections are housed in the casing 9, and disposed to make a series of V configurations. The folding portions (apex portions) are formed by separate filter sections, and hence joined by an adhesive or the like to prevent air leak. Further, the honeycomb structure product has high strength, and a self standing property. For this reason, it does not require a member such as a corrugated spacer or a hard porous product, and it is easy to assemble.

Further, with the adsorption filter of the present invention, it is possible to remove at least one component of a cohesive organic substance in an air, a basic gas, and an acidic gas.

Further, with the adsorption filter of the present invention, it is possible to carry a large quantity of an adsorbing medium in the pores and on the surface of fibrous substrate, which enables the improvement of the removing performance.

Still further, with the adsorption filter of the present invention, the honeycomb filtering medium 2 can be positioned to be self-standing by the protrusions 31 and 34, and/or the concave grooves 38 and 39. Therefore, it is possible to house the honeycomb filtering medium 2 stably in the casing 9.

Moreover, with the adsorption filter of the present invention, the honeycomb filtering medium 2 is fixed by the protrusions 31 and 34, and/or the concave grooves 38 and 39 without being bonded thereto. Therefore, in contrast to the case using a bonding agent such as an adhesive, it is free from the generation of out gas, which enables the manufacturing process to be kept clean.

Furthermore, with the adsorption filter of the present invention, the honeycomb filtering medium 2 is fixed by the protrusions 31 and 34, and/or the concave grooves 38 and 39, and hence other components are not required in contrast with the case of screwing or the like. Therefore, there is no possibility of an increase in number of components.

Moreover, with the manufacturing method of the adsorption filter of the present invention, for the incorporation of the honeycomb filtering medium 2 into the casing 9, it is required only that the honeycomb filtering medium 2 is interposed by the protrusions 31 and 34 and/or the concave grooves 38 and 39 to be housed in the casing 9. Therefore, the method is simple and requires no specific skill, which can improve the workability.

EXAMPLES

The present invention will be illustrated in greater detail with reference to the following Examples, but the invention should not be construed as being limited thereto.

Example 1

Manufacturing of Adsorption Filter

On the top surface of a flat fibrous substrate 3 (see FIG. 1) made of a silica/alumina fiber (average fiber diameter 50 mm, average fiber length 20 mm), and having an interfiber porosity of 90% and a thickness of 0.2 mm, a suspension containing a powdered activated carbon and an acrylic type copolymer binder was coated so that the amount of activated carbon carried was 90 g/m². After drying, the substrate 3 was treated at a temperature of 110° C. to manufacture an activated carbon-coated substrate.

Figure 2:
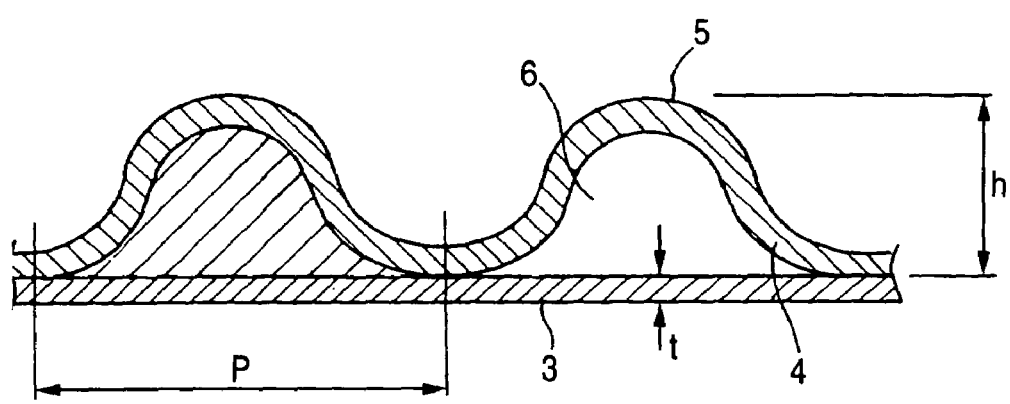
FIG. 2 is a schematic cross sectional view of a corrugated honeycomb filtering medium for use in the invention.

The activated carbon-coated substrate was divided into a portion to be corrugated and a portion not to be corrugated. The portion to be corrugated was caused to pass through a pair of upper and lower corrugated rolls, thereby obtaining a corrugated product 4. An acrylic type copolymer binder was applied to the crest portions (see FIG. 2) of the corrugated product 4. The flat product 3 not corrugated was stacked thereon for lamination, thereby forming cavities 6 and openings 7. This operation was repeatedly carried out to obtain a plate-shaped honeycomb structure block which was a laminated body of a partial structure having a wavelike corrugation pitch (p) of 2.5 mm, a cell height (h) of 1.1 mm, and a wall thickness (t) of 0.33 mm (see FIGS. 1 and 2).

Then, the plate-shaped honeycomb structure block was dipped in a 10% potassium carbonate aqueous solution as a reactive material for adsorbing a gas, and then dried to manufacture a honeycomb structure block intended for removing SOx as an acidic contaminant. The amount of potassium carbonate carried at this step was 30 kg/M³.

The thus obtained honeycomb structure block was cut into dimensions of 300×300×110 mm, and incisions were alternately made therein. Ten incisions were made at an interval (D) of 10 mm, leaving 2 mm (non-incised residual length: E) relative to complete cutting. The honeycomb structure product thus incised was extended. Then, separators were inserted from the front and rear directions, and placed in a frame having casing outside dimensions of 305×305×300 mm, and fixed (see FIGS. 3 to 5).

Comparative Example 1

Basic substance-impregnated activated carbon pellets for removing an acidic substance were put in a sack for activated carbon. The sack was housed in a filter frame to prepare 5 sheets of filter cassettes with outside dimensions of 300×300×30 mm. As the filter frame, a frame made of aluminum with a wall thickness of 1.5 mm and a folding length of 15 mm and having a shape of letter U was used. The respective filter cassettes were placed in a casing having outside dimensions of 305×305×300 mm, and disposed in the shape of letter V, and fixed.

Comparative Example 2

An activated carbon-incorporated felt type sheet was bonded with webs made of aluminum (hard porous product) on the both sides thereof to form a filtering medium. As the activated carbon, a basic substance-impregnated charcoal for removing an acidic substance was used. The filtering medium had dimensions of 300 mm×5 m×5 mm (This 5-m filtering medium was folded in a pleated form, and placed in a casing of 305×305×300 mm).

The adsorption filters for acid removal manufactured in Example 1 and Comparative Examples 1 and 2 were measured for SO₂ removing performance of the adsorption filter, pressure loss (Pa), and weight of the adsorption filter under the following test conditions.

Test conditions

Composition of ventilation gas:
Air containing $SO_2$ in an amount of 10 vppb;
Temperature and humidity of ventilation gas: 23° C., 50% RH;
Gas to be removed: $SO_2$;
Ventilation gas volume: 15 m³/min;
Gas collecting method: Impinger concentration method; and
Analysis device: Ion chromatograph Test Results The test was carried out under the foregoing test conditions. As a result, the differences as shown in Table 1 were caused between Example 1, and Comparative Examples 1 and 2.

TABLE 1

| | Example 1 | Comparative Example 1 | Comparative Example 2 |
|---|---|---|---|
| SO₂ removing performance | 91% | 91% | 88% |
| Pressure loss | 95 Pa | 170 Pa | 150 Pa |
| Weight | 5.3 kg | 21.0 kg | 4.1 kg |

As shown in Table 1, the adsorption filter of the invention does not undergo a pressure loss and a large increase in weight, and satisfactorily gives an $SO_2$ removing performance of 90% or more. On the other hand, the filter case of Comparative Example 1 is of an activated carbon-filled filter cassette type, and hence it has a large product weight. The adsorption filter of Comparative Example 2 includes a felt-like filtering medium, and hence has a small product weight. However, it is high in pressure loss, and lower in removing performance as compared with the adsorption filter of the invention.

While the present invention has been described in detail and with reference to specific embodiments thereof, it will be apparent to one skilled in the art that various changes and modifications can be made therein without departing from the spirit and scope thereof.

The present application is based on Japanese Patent Application Nos. 2004-097824 (filed Mar. 30, 2004) and 2004-287856 (filed Sep. 30, 2004), the contents thereof being herein incorporated by reference.

What is claimed is:

1. An adsorption filter, comprising:
at least one thin plate honeycomb filtering medium carrying a gas-adsorbing medium thereon, the at least one thin plate honeycomb filtering medium including incisions in a direction vertical to a flute direction thereof in a staggered manner; and
a filter case housing the honeycomb filtering medium therein,
wherein the thin plate honeycomb filtering medium is extended by pulling ends thereof and is disposed in the filter case in such a manner as to make a series of V configurations with respect to a ventilation direction, wherein the thin plate honeycomb filtering medium is self-standing by a fixing member formed in the filter case, and wherein the filter case has a groove or protrusion serving as the fixing member for fixing the thin plate honeycomb filtering medium, and further has slits in accordance with an opening width of the respective V-configuration formed by the thin plate honeycomb filtering medium.

2. The adsorption filter according to claim 1, wherein the series of V configurations is formed by one thin plate honeycomb filtering medium carrying a gas-adsorbing medium thereon.

3. The adsorption filter according to claim 1, wherein the series of V configurations is formed by a plurality of thin plate honeycomb filtering media each carrying a gas-adsorbing medium thereon, wherein each apex portion of the V configurations is made by adjacent two of the plural honeycomb filtering media.

4. The adsorption filter according to claim 1, wherein the gas-adsorbing medium comprises at least one member selected from an activated carbon, zeolite, an ion exchange resin, an inorganic base, an acidic inorganic salt, and an inorganic acid.

5. The adsorption filter according to claim 1, wherein the honeycomb filtering medium comprises fibrous substrate.

6. The adsorption filter according to claim 1, wherein the fixing member fixes the thin plate honeycomb filtering medium without any bonding agent.

7. A method for manufacturing an adsorption filter, comprising:
providing a thin plate honeycomb filtering medium carrying a gas-adsorbing medium thereon;
making incisions in the honeycomb filtering medium in a direction vertical to a flute direction thereof in a staggered manner;
pulling the incised filtering medium at ends thereof to extend the filtering medium;
disposing the extended filtering medium in such a manner as to make a series of V configurations with respect to a ventilation direction; and
housing the honeycomb filtering medium in a filter case by interposing each apex portion of the V-configurations formed by the honeycomb filtering medium into a fixing portion formed by a fixing member formed in the filter case.

8. The method according to claim 7, wherein the series of V configurations is formed by one thin plate honeycomb filtering medium carrying a gas-adsorbing medium thereon.

9. The method according to claim 7, wherein the series of V configurations is formed by a plurality of thin plate honeycomb filtering media each carrying a gas-adsorbing medium thereon, wherein each apex portion of the V configurations is made by adjacent two of the plural honeycomb filtering media.

10. The method according to claim 7, wherein the gas-adsorbing medium comprises at least one member selected from an activated carbon, zeolite, an ion exchange resin, an inorganic base, an acidic inorganic salt, and an inorganic acid.

11. The method according to claim 7, wherein the honeycomb filtering medium comprises fibrous substrate.

12. The method according to claim 7, wherein the thin plate honeycomb filtering medium is self-standing by a fixing member formed in the filter case.

13. The method according to claim 12, wherein the fixing member fixes the thin plate honeycomb filtering medium without any bonding agent.

14. The method according to claim 12, wherein the filter case has a groove or protrusion serving as the fixing member for fixing the thin plate honeycomb filtering medium, and further has slits in accordance with an opening width of the respective V-configuration formed by the thin plate honeycomb filtering medium.

* * * * *